(12) United States Patent
Watanabe et al.

(10) Patent No.: US 11,392,352 B2
(45) Date of Patent: *Jul. 19, 2022

(54) GUIDED WEB-APPLICATION GENERATION

(71) Applicants: Kaoru Watanabe, Sunnyvale, CA (US); Jiang Hong, San Jose, CA (US)

(72) Inventors: Kaoru Watanabe, Sunnyvale, CA (US); Jiang Hong, San Jose, CA (US)

(73) Assignee: RICOH COMPANY, LTD., Tokyo (JP)

(*) Notice: Subject to any disclaimer, the term of this patent is extended or adjusted under 35 U.S.C. 154(b) by 18 days.

This patent is subject to a terminal disclaimer.

(21) Appl. No.: 16/882,385

(22) Filed: May 22, 2020

(65) Prior Publication Data
US 2020/0394023 A1 Dec. 17, 2020

Related U.S. Application Data

(63) Continuation of application No. 15/886,501, filed on Feb. 1, 2018, now Pat. No. 10,664,245.

(51) Int. Cl.
G06F 8/35 (2018.01)
G06F 8/20 (2018.01)
G06F 8/36 (2018.01)
G06F 8/34 (2018.01)
G06F 16/907 (2019.01)

(52) U.S. Cl.
CPC ............... G06F 8/35 (2013.01); G06F 8/20 (2013.01); G06F 8/34 (2013.01); G06F 8/36 (2013.01); G06F 16/907 (2019.01)

(58) Field of Classification Search
None
See application file for complete search history.

(56) References Cited

U.S. PATENT DOCUMENTS 5,710,901 A * 1/1998 Stodghill .............. G06F 16/215
715/217
6,476,828 B1 * 11/2002 Burkett ................... G06F 9/451
715/236

(Continued)

FOREIGN PATENT DOCUMENTS

WO WO2014127293 A2 * 8/2014 ............... G06F 7/06

OTHER PUBLICATIONS

Koers, "How to Split Data into Multiple Column in Excel 2010", 2013, Published bydummies.com (Year: 2013).*

(Continued)

Primary Examiner — Hossain M Morshed
(74) Attorney, Agent, or Firm — Hickman Becker Bingham Ledesma LLP; Edward A. Becker

(57) ABSTRACT

Techniques are described herein for generating and managing Web applications. Embodiments include receiving organized data and analyzing the organized data to determine one or more data types contained in the organized data. Based on the one or more data types, suggested widgets are determined, including determining whether a particular data type can be split into two or more data types and suggesting widgets for each split data type. The suggested widgets are presented to a user, and in response to user input accepting the suggested widgets, a Web application comprising the suggested widgets is generated.

20 Claims, 7 Drawing Sheets

(56) References Cited

U.S. PATENT DOCUMENTS

| | | | | |
|---|---|---|---|---|
| 6,570,597 B1* | 5/2003 | Seki | G06F 3/04817 | 715/837 |
| 6,701,345 B1* | 3/2004 | Carley | G06F 16/252 | 709/205 |
| 7,254,782 B1* | 8/2007 | Sherer | G16H 10/60 | 715/764 |
| 7,415,484 B1* | 8/2008 | Tulkoff | G06F 3/0481 | |
| 7,835,504 B1* | 11/2010 | Donald | H04M 1/72436 | 379/88.13 |
| 7,895,522 B2* | 2/2011 | Wong | H04L 67/36 | 715/788 |
| 8,458,612 B2* | 6/2013 | Chatterjee | G06F 3/04817 | 715/767 |
| 8,788,955 B2* | 7/2014 | Quine | G06F 8/34 | 715/769 |
| 8,806,348 B2* | 8/2014 | Quine | G06F 8/34 | 715/744 |
| 9,087,361 B2* | 7/2015 | Mirra | G06Q 40/06 | |
| 9,116,716 B2* | 8/2015 | Bharatia | G06F 9/4496 | |
| 9,171,076 B2* | 10/2015 | Boezeman | G06F 16/95 | |
| 9,594,814 B2* | 3/2017 | Miller | G06F 7/24 | |
| 9,904,536 B1* | 2/2018 | Qian | G06F 8/65 | |
| 10,664,245 B2* | 5/2020 | Watanabe | G06F 8/36 | |
| 2002/0026579 A1* | 2/2002 | Wiederin | H04M 15/745 | 713/162 |
| 2009/0138792 A1* | 5/2009 | Cudich | G06F 40/10 | 715/234 |
| 2011/0119618 A1* | 5/2011 | Nestler | G06F 8/36 | 715/811 |
| 2011/0209069 A1* | 8/2011 | Mohler | H04L 67/24 | 715/744 |
| 2011/0252427 A1* | 10/2011 | Olston | G06F 16/951 | 718/102 |
| 2011/0301977 A1* | 12/2011 | Belcher | G16H 10/60 | 715/764 |
| 2012/0144285 A1* | 6/2012 | Bach | G06F 40/18 | 715/221 |
| 2012/0180033 A1* | 7/2012 | Brown | G06F 8/20 | 717/168 |
| 2012/0185874 A1* | 7/2012 | Cookson | H04L 67/10 | 719/313 |
| 2014/0032392 A1* | 1/2014 | Ansari | G06Q 40/02 | 705/38 |
| 2014/0040656 A1* | 2/2014 | Ho | G06F 8/61 | 718/1 |
| 2014/0089825 A1* | 3/2014 | Lee | G06F 3/048 | 715/762 |
| 2014/0196022 A1* | 7/2014 | Skutin | G06F 8/61 | 717/176 |
| 2014/0223350 A1* | 8/2014 | Woodward | G06F 3/0486 | 715/771 |
| 2014/0282155 A1* | 9/2014 | Kim | G06F 3/0488 | 715/765 |
| 2015/0019991 A1* | 1/2015 | Kristj Nsson | H04L 41/0853 | 715/747 |
| 2015/0113451 A1* | 4/2015 | Kopp | G06F 16/242 | 715/764 |
| 2017/0039038 A1* | 2/2017 | Huber | G06F 11/3072 | |
| 2017/0046144 A1* | 2/2017 | Chen | G06F 8/60 | |
| 2017/0206326 A1* | 7/2017 | Klein | G06Q 40/08 | |
| 2017/0300554 A1* | 10/2017 | Ayik | G06F 16/285 | |
| 2018/0039611 A1* | 2/2018 | Trivedi | G06F 16/957 | |
| 2018/0052891 A1* | 2/2018 | Shuster | G06F 16/24568 | |
| 2018/0275845 A1* | 9/2018 | Barbee | G06F 3/0482 | |
| 2018/0300437 A1* | 10/2018 | Thomsen | G06F 40/117 | |
| 2019/0079980 A1* | 3/2019 | Mallah | G06F 8/38 | |
| 2019/0235845 A1* | 8/2019 | Watanabe | G06F 16/907 | |
| 2020/0349324 A1* | 11/2020 | Ostby | G06F 40/30 | |

OTHER PUBLICATIONS

Zhang, "A Novel Approach for Web-based Data Input Panel Design", 2005, IEEE (Year: 2005).*

Chemaxon, "Table Widget", 2017, published at https://docs.chemaxon.com/display/docs/Table+Widget (Year: 2017).*

* cited by examiner

TABLE 500

| Segment | Country | Product | Discount Band | Units Sold |
|---|---|---|---|---|
| Government | Canada | Carretera | None | 1018.5 |
| Government | Germany | Carretera | None | 1321.0 |
| Midmarket | France | Carretera | None | 2178.0 |
| Midmarket | Germany | Carretera | None | 888.0 |
| Midmarket | Mexico | Carretera | None | 2470.0 |
| Government | Germany | Carretera | None | 1513.0 |
| Midmarket | Mexico | Montana | None | 921.0 |
| Channel Partners | Canada | Montana | None | 2518.0 |

GUIDED WEB-APPLICATION GENERATION

RELATED APPLICATION DATA AND CLAIM OF PRIORITY

This application is a Continuation of prior U.S. patent application Ser. No. 15/886,501 entitled "GUIDED WEB-APPLICATION GENERATION", filed Feb. 1, 2018, the contents of which are incorporated by reference for all purposes as if fully set forth herein.

FIELD OF THE INVENTION

Embodiments relate to generation and management of Web applications. SUGGESTED GROUP ART UNIT: 2625; SUGGESTED CLASSIFICATION: 358

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users in small and medium business (SMBs) environments need to track and organize data for a variety of business tasks, such as purchase orders, trial requests, daily transactional data, and etc. SMB users may use spreadsheet software, simple database applications, or word processing software to store data. However, the data is typically stored as files, and multiple users may not access or modify a file at the same time. Users may generate multiple copies of a file in order to share the file with others or track changes to the data, or store multiple files corresponding to different business tasks. It is difficult for users to consolidate data between versions of a file, determine which file is the most current, or otherwise share and organize files.

A large database system allows many users or client applications to connect to the database at the same time. However, large database systems may be costly or impractical for a SMB to implement. A large database system incurs setup and administration costs that may exceed the usefulness of such a system to a SMB. In addition, a database application may be specifically programmed based on particular use cases. A new application may need to be developed when new, unique transactions that do not correspond to existing use cases need to be stored.

Thus, it is desirable and beneficial to store and manage database data in a low cost, flexible system that allows sharing between multiple users.

SUMMARY

According to another embodiment, a system includes one or more processors and a non-transitory computer-readable medium storing instructions. When executed by the one or more processors, the instructions cause receiving organized data. In response to receiving the organized data, a plurality of data types contained in the organized data are determined. One or more suggested widgets for each data type of the plurality of data types are determined. Determining the one or more suggested widgets comprises determining a particular data type can be split into two or more data types and determining a suggested widget for each data type from the two or more data types of the particular data type. The plurality of data types and the determined one or more suggested widget for each data type of the plurality of data types are displayed, including the suggested widget for each data type from the two or more data types for the particular data type. In response to receiving user input accepting the one or more suggested widgets, a Web application comprising the one or more suggested widgets is generated.

BRIEF DESCRIPTION OF THE DRAWINGS

In the drawings:

FIG. 5 depicts example organized data for generating a Web app.

FIG. 6 depicts a preview screen that includes one or more suggested widgets.

DETAILED DESCRIPTION

Figure 1:
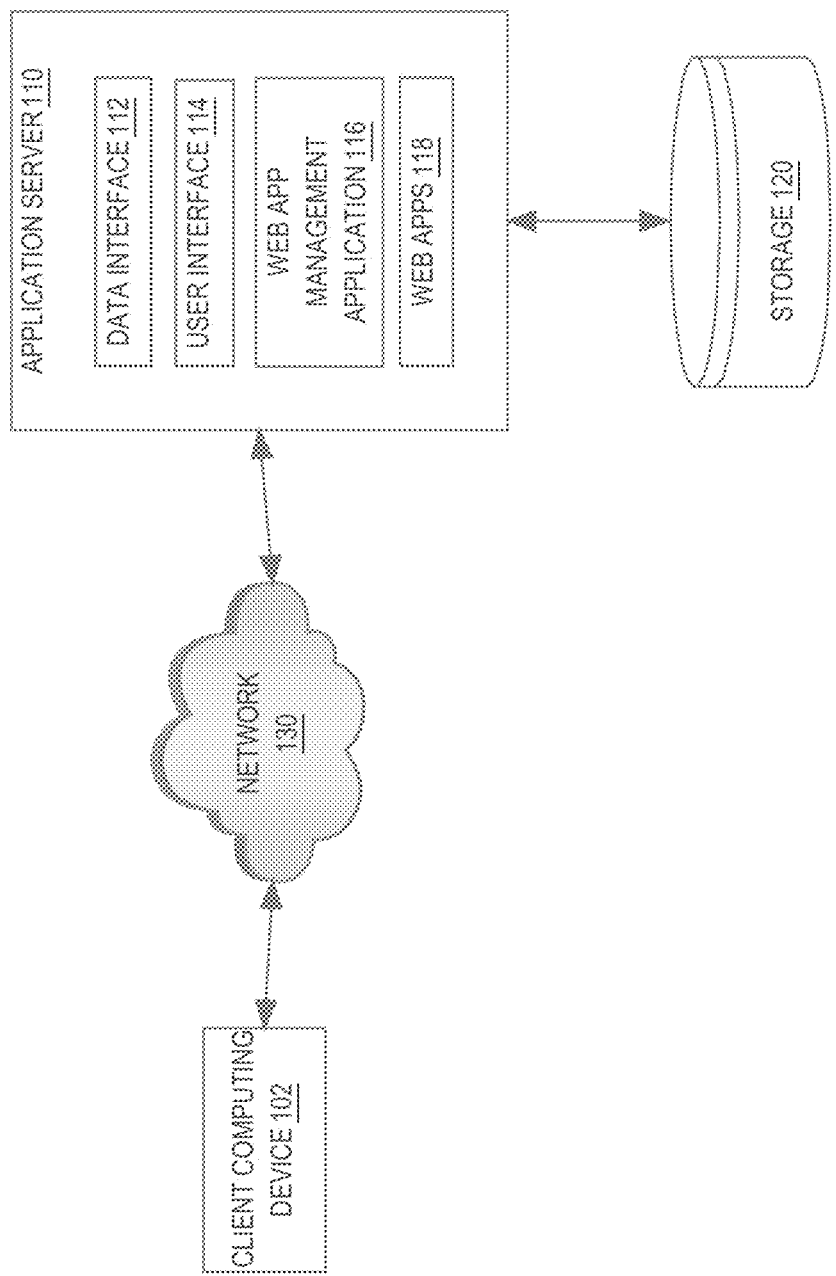
FIG. 1 is a block diagram that depicts an arrangement for generating and managing Web apps.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. SYSTEM ARCHITECTURE
III. WEB APP OVERVIEW
   A. Manual Creation
   B. Automatic Generation
IV. BENEFITS OF CERTAIN EMBODIMENTS
V. IMPLEMENTATION EXAMPLES I. General Overview An approach is provided for generating Web applications, also referred to herein as Web apps. A Web application allows users to enter or import data, and stores the data in a structured manner. For example, Web application data may structured similar to that of a spreadsheet or a database table. The Web application may be shared, accessed, edited, and utilized by multiple users.

According to the approach, organized data is received at a system for generating a Web application. In response to receiving the organized data, a plurality of data types contained in the organized data are determined. For example, the organized data may include names, which correspond to a string data type, and zip codes, which correspond to a numeric data type. One or more suggested widgets for each data type is determined. For example, a string data type may correspond to a text box widget, a numeric data type may correspond to a number widget, a date data type may correspond to a calendar widget, and etc. Determining the one or more suggested widgets may include determining that a particular data type may be split into two or more data types. For example, a string data type corresponding to an address may be split into a numeric data type corresponding to the street number portion of the address and a string data type corresponding to the street name portion of the address. As another example, a string data type corresponding to a customer name may be split into a first string data type corresponding to a first name of the customer and a second string data type corresponding to a last name of the customer. As a third example, a numeric data type corresponding to a phone number may be split into three numeric data types corresponding to a country code, an area code, and a main phone number, respectively. A suggested widget may be determined for each split data type.

The one or more suggested widgets for each data type and the corresponding data type are displayed to a user, including the suggested widget for each of the split data types. The system may allow a user to split a data type into two or more data types or merge two or more data types into a single data type, and suggest one or more modified widgets in response to the split or merge. In addition, the system may allow a user to modify or remove a suggested widget.

Upon receiving user input accepting the current set of suggested widgets, a Web application comprising the current set of suggested widgets is generated. The contents of the organized data may be automatically imported as data managed by the generated Web application.

II. System Architecture

In the example depicted in FIG. 1, application server 110 includes data interface 112, user interface 114, Web app management application 116, and one or more Web apps 118. Application server 110 provides functionality for creating, managing, and accessing Web apps. As an example, application server 110 may generate and serve one or more Web pages that provide a graphical user interface for creating, managing, and accessing the Web apps. Application server 110 may include various other components that may vary depending upon a particular implementation and application server 110 is not limited to a particular set of components or features. Application server 110 may include various hardware and software components that may vary depending upon a particular implementation and application server 110 is not limited to any particular hardware and software components.

Data interface 112 is configured to receive data from client device 102 and may do so using various communication protocols and from various media. Example protocols include, without limitation, the File Transfer Protocol (FTP), the Telnet Protocol, the Transmission Control Protocol (TCP), the TCP/Internet Protocol (TCP/IP), the Hypertext Transfer Protocol (HTTP), the Simple Mail Transfer Protocol (SMTP), or any other data communications protocol. Data interface 112 may be configured to read data from an FTP folder, an email folder, a Web server, a remote media such as a memory stick, or any other media. Data interface 112 may include corresponding elements to support these transport methods.

For example, data interface 112 may include, or interact with, an FTP server that processes requests from an FTP client on client device 102. As another example, data interface 112 may include, or interact with, an email client for retrieving emails from an email server. As yet another example, data interface 112 may include, or interact with, a Web server that responds to requests from an http client on client device 102. Data interface 112 is further configured to support the transmission of data from application server 110 to other devices and processes, for example, client device 102, other computing devices, other services such as Web app management application 116 and Web app 118, and etc.

User interface 114 provides a mechanism for a user, such as an administrator, to access application server 110, data stored on storage 120, and/or Web applications managed by Web app management application 116, as described in more detail hereinafter. User interface 114 may be implemented as an API for application server 110. Alternatively, user interface 114 may be implemented by other mechanisms. For example, user interface 114 may be implemented as a Web server that serves Web pages to provide a Web-based user interface for application server 110.

Web app management application 116 provides functionality for generating and managing Web apps. Example functionality includes receiving organized data, analyzing the organized data to suggest one or more widgets, and generating a Web app comprising the one or more suggested widgets. Example functionality also includes receiving user input specifying one or more widgets and generating a Web app comprising the specified widgets, and modifying or deleting a generated Web app based on user input. Modifying a Web app may include adding, modifying, or removing one or more widgets from the Web app. Modifying the Web app may also include modifying the users who have permission to access, modify, and/or view data for a Web app.

According to one embodiment, Web app management application 116 provides a graphical user interface to allow user access to the aforementioned functionality. The graphical user interface may be provided by application software on client device 102, application software on application server 110 or any combination of application software on client device 102 and application server 110. As one example, the graphical user interface may be implemented by one or more Web pages generated on application server 110 and provided to client device 102. Web app management application 116 may be implemented in computer hardware, computer software, or any combination of computer hardware and software. For example, Web app management 116 may be implemented as an application, e.g., a Web application, executing on application server 110.

One or more Web apps 118 are generated by Web app management application 116. The one or more Web apps may be data management applications that manage and store data. For example, an order information Web app may manage data related to orders received by a company, such as order numbers, order items, quantities, and total cost. An items Web app may store item data for products that a company sells. Web apps may also store links to data stored by other Web apps, or import data stored by other Web apps. For example, the order information Web app may include item information retrieved from the items Web app.

Each Web app comprises one or more widgets. The one or more Web apps 118 process and manage data received from client device 102 as described in more detail below. Data managed by the Web apps 118 may be stored in storage 120.

According to one embodiment, a Web app 118 provides a graphical user interface to allow users to add, modify, delete, or view data. The graphical user interface may be provided by application software on client device 102, application software on application server 110, or any combination of application software on client device 102 and application server 110. As one example, the graphical user interface may be implemented by one or more Web pages generated on application server 110 and provided to client device 102. Web app management application 116 may be implemented in computer hardware, computer software, or any combination of computer hardware and software.

Storage 120 may include any type of storage, such as volatile memory and/or non-volatile memory, hard drives, etc.

Network 130 may include any number and type of wired or wireless networks, such as local area networks (LANs), wide area networks (WANs), one or more internetworks such as the public the Internet, a cellular network, a company network, or etc. Network 130 may also include one or more computing devices, such as one or more server computers, load-balancing computers, cloud-based computers, data centers, storage devices, and/or any other special-purpose computing devices. The various elements depicted in FIG. 1 may also communicate with each other via direct communications links.

In one embodiment, client computing device 102 is any computing device, such as a work station, personal computer, general purpose computer, laptop, hand-held computer, wearable computer, cellular or mobile phone, portable digital assistant (PDA), tablet computer, and the like. Although embodiments are depicted in the figures and described herein in the context of a single client computing device, this is done for explanation purposes only, and embodiments are applicable to any number of client computing devices. Each client computing device 102 is communicatively connected to server computer 110 through network 130.

Client computing device 102 may include other elements, such as one or more input devices, memory, processors, and the like, which are not depicted in FIG. 1 for purposes of explanation. Client computing device 102 may also include applications, software, and other executable instructions to facilitate various aspects of embodiments described herein. These applications, software, and other executable instructions may be installed by a user, owner, manufacturer, or other entity related to the client computing device.

In one embodiment, client computing device 102 includes a browser. A browser is a computer application that may request and process Web pages from Web servers, such as application server 110, to generate graphical user interfaces that are presented to a user through one or more devices, such as a display.

III. Web App Overview

A Web app is an application executing on a server, such as application server 110, that is accessible from a client computing device via a network. In an embodiment, the one or more Web apps 118 are data management applications such as a spreadsheet or a database app. Users may input or import data into the Web app. The Web app stores and manages the received data. The Web app may also provide various visualizations of the stored data, such as tables, graphs, charts, and may also filter or sort the data.

In an embodiment, data managed by a Web app is stored in an organized format. For the purpose of illustrating a clear example, embodiments are described herein wherein the data comprises one or more data records, each data record including a set of data fields. However, in other embodiments, the data may be organized in other ways that may vary depending upon a particular implementation.

In an embodiment, a Web app includes one or more widgets. A widget, as used herein, refers to any control element in a graphical user interface of a Web app. A widget may be, for example: a display widget, an input widget, a user interface widget, a data processing widget, a decision widget, a dialog widget, an event listener widget, and etc. A widget may also be a combination of a plurality of widget types or functionality. In an embodiment, users enter data for the Web app using the one or more widgets. Each widget of the Web app may correspond to a data field for a data record stored by the Web app. For example, a customer record storing customer information may include a customer name field and a customer address field. A first widget may correspond to the customer name field, and a second widget may correspond to the customer address field. A user may enter a customer name and a customer address using the first and second widgets, respectively. In response, the Web app generates and stores a data record comprising the customer information that was entered.

In an embodiment, each widget of the Web app is a particular widget type. Example widget types include numeric, single-line text, multi-line text, rich text, check box, radio button list, date/calendar, time, dropdown list, email, and etc. The type of data that is entered using the widget may vary depending on the widget type. Referring to the above example, a widget for entering a customer name may be a single-line text widget type.

In an embodiment, the Web app includes a graphical user interface for data entry comprising the one or more widgets of the Web app. Graphical user interface elements corresponding to the one or more widgets may be arranged in a particular layout within the data entry graphical user interface.

Each widget may include one or more properties. The properties may include a widget name corresponding to the field name of the associated data field. Additional properties for a widget may vary depending on the particular widget type. The properties may specify the format, type, and/or other properties of the data entered into the widget. For example, a numeric widget type may include properties such as number format, minimum value, maximum value, comma placement, and decimal placement. As another example, a dropdown widget type may include a list of dropdown values. In an embodiment, the one or more properties for a widget each include a default value.

In an embodiment, the widget types include a calculation widget type. A widget that is a calculation widget type includes a formula property, and calculates a data value based on the formula. The formula may include pre-defined values and/or specify values received from other widgets.

As an example, a Web app may include a widget corresponding to item price and a widget corresponding to order quantity. A calculation widget corresponding to order price may include the formula: "item price*order quantity." After data is entered for the item price widget and the order quantity widget, the order price widget may automatically calculate a value based on the data entered for the item price widget and the order quantity widget. In addition, the calculation widget may automatically update its value when the corresponding widget values are modified (e.g., item price and/or order quantity).

In an embodiment, the widget types include a lookup widget type. A widget that is a lookout widget type includes a source app property value and a key field property value. The source app property value indicates which Web app to look up data from, and the key field property value indicates the field or column whose value should be checked. The widget receives a lookup value and searches the source app for data records whose key field value matches the lookup value. The widget may also include a field mapping property. The field mapping maps a field value in the source app to a particular widget in the Web app. Selecting a particular record from one or more search results populates the particular widget with the value of the mapped field.

Referring to the above example, an order information Web app may include a lookup widget that searches the "customer name" field of a Web app storing customer data. The "customer ID" field from the customer data Web app is mapped to a "customer ID" widget in the order information Web app. When a user inputs a customer name into the lookup widget, a set of one or more records whose customer name matches the lookup value are displayed. The user may select a particular record from the one or more matching records, and the customer ID of the particular record is entered as the value for the "customer ID" widget in the orders Web app. In an embodiment, updating the corresponding record also updates the mapped value.

In an embodiment, the Web app provides functionality for sorting, filtering, and displaying the managed data. The Web app may display the data in a graphical format, such as a table, graph, chart, or other data visualization. Data managed by the Web app may also be exported into a data file, such as a comma-separated value (CSV) file or other file format for storing organized data.

Figure 2:
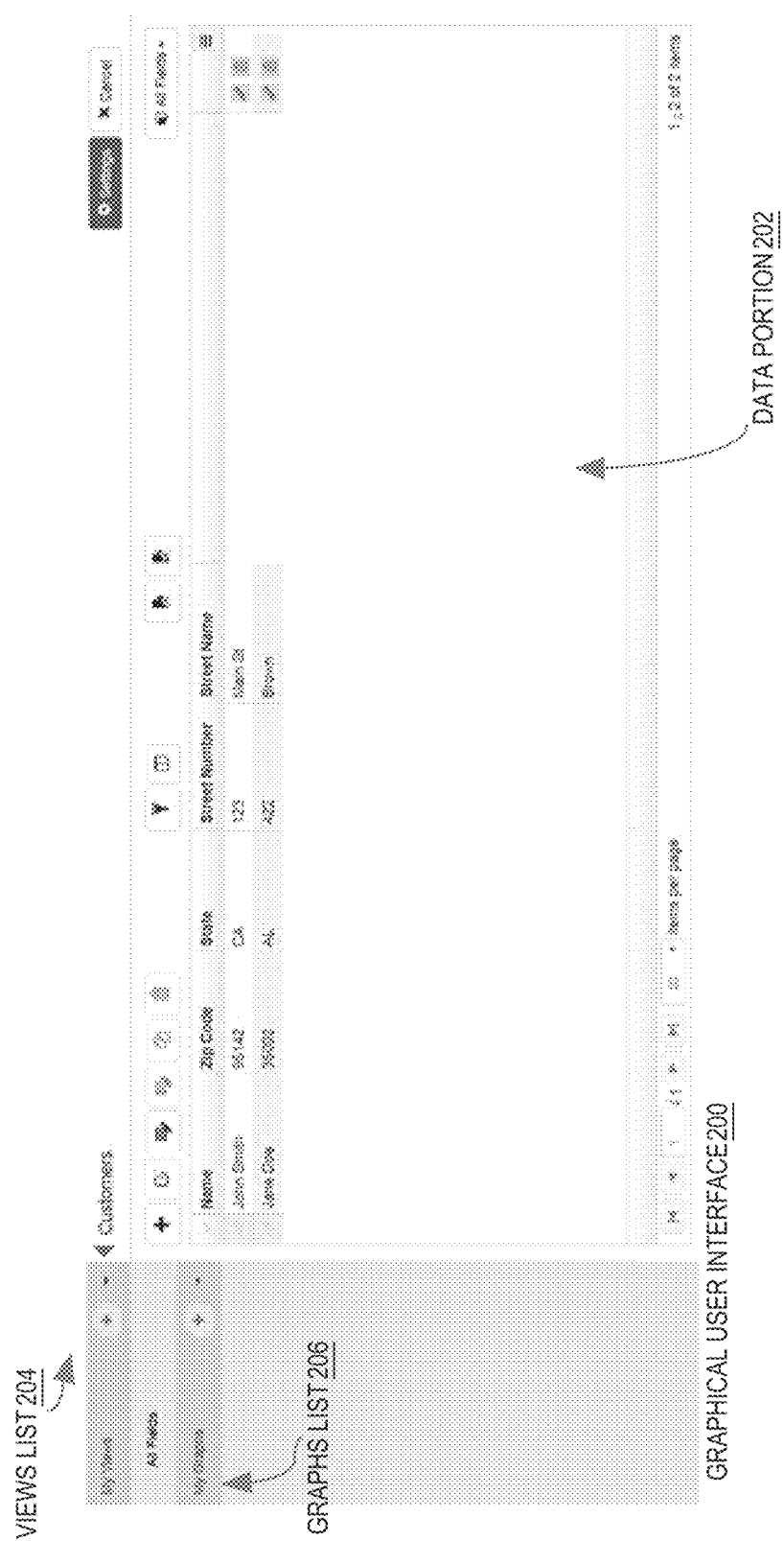
FIG. 2 depicts an example Web app graphical user interface.

FIG. 2 illustrates an example Web app graphical user interface 200. The graphical user interface 200 includes a data portion 202 that displays data stored by the Web app. Data portion 202 includes controls for modifying a single data record, modifying multiple data records at the same time (batch modifications), or modifying a single field. The controls may allow a user to modify the record in-line, within the data portion 202 display.

The graphical user interface 200 also includes a views list 204 that displays a list of stored views. A stored view may specify data filters, sorting, grouping, and other data display options. Selecting a stored view may update the data displayed in data portion 202.

The graphical user interface 200 also includes a graphs list 206 that displays a list of stored graphs. A stored graph may specify a graph type and one or more data fields to be graphed. The stored graph may also group, aggregate, filter, and/or sort one or more data fields. Selecting a stored graph may cause a graph to be generated based on the current set of data stored by the Web app.

A. Manual Web App Creation

Figure 3:
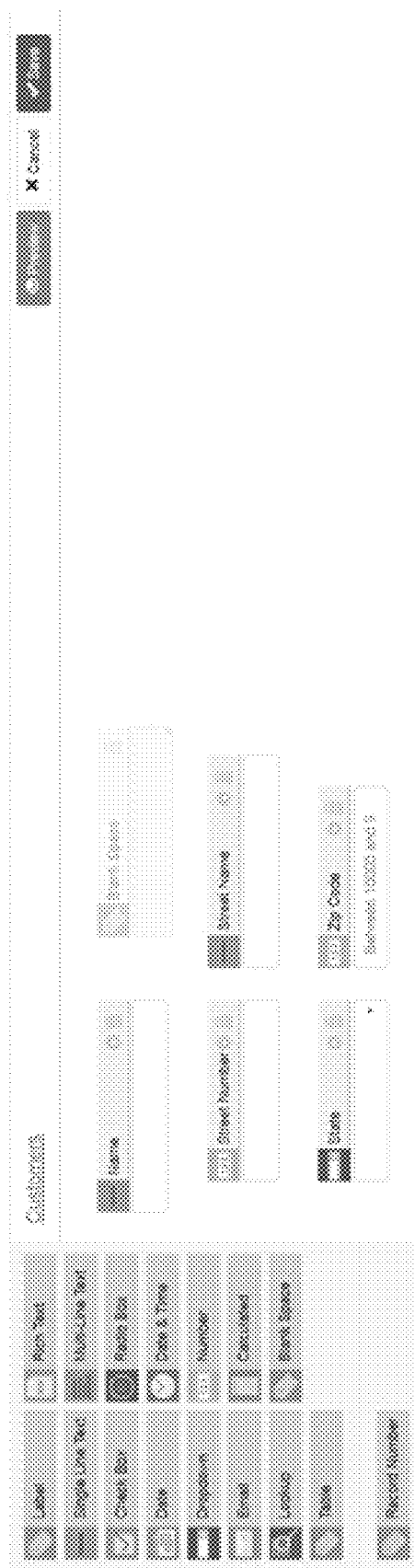
FIG. 3 depicts an example graphical user interface for manually creating a Web app.

In an embodiment, the Web app management application provides a graphical user interface for manually creating a Web app. A user may select one or more widgets to include in the Web app. The user may also arrange the widgets in a desired order and/or layout. For example, a user may drag and drop widgets into place within a Web app creation GUI. The user may also specify the properties for each widget. FIG. 3 illustrates an example Web app creation GUI. The Web app creation GUI 300 includes a widget selection portion 302 and a layout portion 304. The widget selection portion 302 displays a set of available widgets. In the illustrated example, the widget selection portion 302 indicates the widget type of each widget.

A user may drag the user interface element corresponding to a widget from widget selection portion 302 into a layout portion 304. The layout portion 304 displays one or more user interface elements corresponding to widgets selected by the user. The user interface element corresponding to the selected widget may be placed in layout portion 304 where it has been dropped, or the user interface element may be snapped into a grid or other layout locations. In some embodiments, previously-placed user interface elements within layout portion 304 may be moved to accommodate the dropped widget. As the user interface element is dragged over layout portion 304, the positions of other user interface elements within layout portion 304 may be updated to indicate where they would be moved to if the selected user interface element is dropped at the current location.

Referring to FIG. 3, after the user interface element for a widget is placed in layout portion 304, the user interface element includes buttons for modifying the widget properties and for deleting the widget. Selecting the properties button may launch a dialog where users can input property values for widget properties. For example, for a numeric widget type, the user may be able to specify minimum and maximum values and specify a number format.

As another example, for a calculation widget, a graphical user interface may be provided for inputting a formula for the calculation. The graphical user interface may provide a list of other widgets in the Web app and a list of operations. The user may select from the lists to define a calculation.

As a third example, for a lookup widget, a graphical user interface may be provided for selecting a lookup source and for specifying a field mapping. The graphical user interface may display a list of other Web apps managed by the Web app management application 116. After a source Web app is selected, a list of widgets of the source Web app may be displayed. A widget from the source Web app may be mapped to a widget in the current Web app. For example, available Web apps may include a customers Web app and an items Web app. If customers is selected, the widgets customer name, customer ID, customer address, and customer phone number may be displayed as widgets that may be mapped. Selecting customer ID, a numeric widget type, may cause a list of numeric widget types in the current widget, which can be mapped to customer ID, to be displayed.

In an embodiment, a user may select one or more layout widgets. A layout widget may be, for example, a label, divider, blank space, or other graphical user interface component that affects the look or layout of the Web app.

The user may then choose to save the Web app. A new Web app is generated comprising the one or more widgets in the specified layout. When a new record is being added for the Web app, a graphical user interface comprising user interface elements corresponding to the one or more widgets is displayed in the specified layout for data entry.

B. Guided Generation

Figure 4:
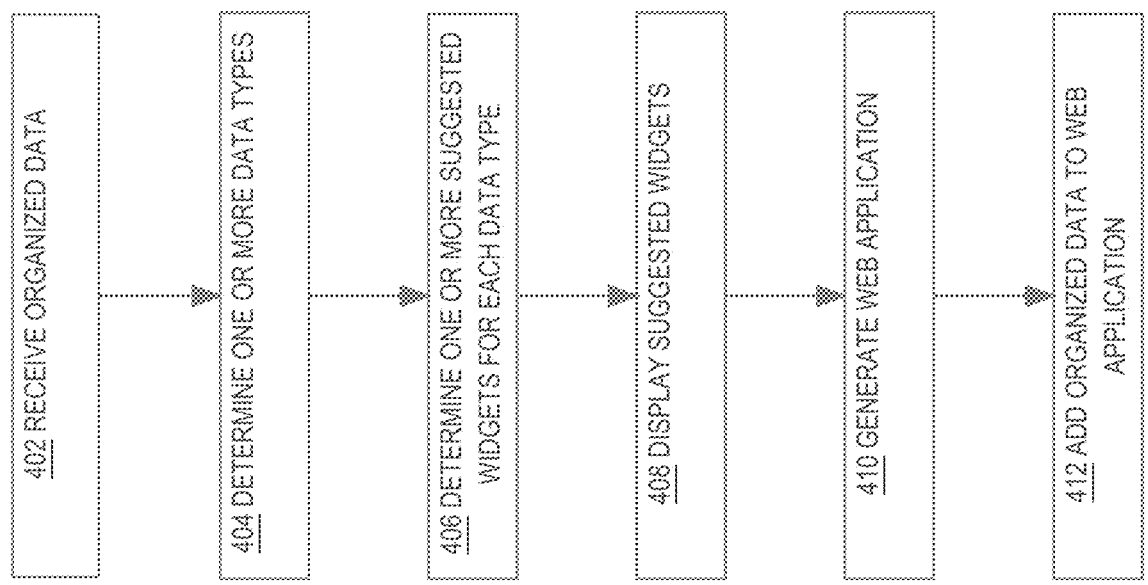
FIG. 4 is a flow diagram that depicts an approach for guided generation of a Web app based on received organized data.

FIG. 4 illustrates example steps for guided generation of a Web app based on organized data.

At step 402, organized data for generating a Web app is received. The organized data may be retrieved in response to a user invoking the Web app management application 116, selecting an option to import data for generating a Web app, and selecting a file containing the organized data. For example, a user may select an icon in a graphical user interface of Web app management application 116 to invoke guided Web app generation instructions. The user is then queried for one or more files to be used for generating the Web app. The user may then select one or more files, or specify a location, e.g., a path, of one or more files to be used.

The organized data may be retrieved from any source, such as from client computing device 102, storage 120, another server computer, or another service or application. The file may be a structured data file such as CSV, XLS, XML, JSON, and etc. Additionally or alternatively, the file may be a document depicting a form or other structured document, such as an image file, text document, or a PDF. FIG. 5 depicts example organized data that includes one or more data types. In the illustrated example, the organized data is a spreadsheet table 500 comprising a plurality of rows and columns.

At step 404, one or more data types contained in the organized data are determined. Referring to FIG. 5, a data type for each column of table 500 is determined. This may be accomplished using a wide variety of techniques that may vary depending upon a particular implementation and the type of data file received, and embodiments are not limited to any particular technique for determining data types. For example, for a table, data types may be determined from labels. The labels may be, for example, for rows and columns in the table. As another example, for a table, the data contained in each row of a column may be analyzed to determine a data type of the column. If the data in all rows of the column are a particular data type, such as all numeric values, then the data type for the column is the particular data type. In some embodiments, if a data type cannot be determined, then a default data type may be selected, such as text (string) data type. As another example, a CSV file may be parsed to determine one or more records comprising one or more fields. The contents of the fields may be analyzed to determine the one or more data types.

In an embodiment, the file may be a document depicting a form or other structured document. The file may be analyzed to identify one or more fields depicted in the document. A data type is determined for each field of the one or more fields. A variety of techniques may be used to identify the one or more fields. For example, the file may be an image of a form. Text recognition and/or image analysis may be used to identify one or more fields depicted in the form.

In an embodiment, determining the one or more data types includes determining if a data type may be split into two or more data types. Determining whether a data type may be split may be based on analyzing the portions of the organized data corresponding to the data type. Various techniques may be used to determine whether a data type may be split into two or more data types.

In an embodiment, determining whether a data type may be split includes determining whether the corresponding data includes two or more sub-data-types. For example, the data type of an address field may be a string. The Web app management application 116 may analyze the data to determine that the field comprises both numbers (the street number of an address) and letters (the street name). The string data type may be split into a numeric data type and a string data type.

In an embodiment, determining whether a data type may be split includes determining whether the corresponding data includes one or more delimiters, such as carriage return, line breaks, spaces, commas, semicolons, and etc. For example, the data type of a customer name field may be a string. The Web app management application 116 may analyze the data to determine that the customer names comprise a first string (first name) and a second string (last name), separated by a space character. The string data type may be split into two string data types.

In an embodiment, in response to determining that a data type can be split into two or more data types, the two or more data types are presented to the user in a graphical user interface. The user may select particular data types of the two or more data types. For example, the graphical user interface may indicate that a name string may be split into three strings: first name, middle name, and last name. A user may choose to split the name string into only two strings: first name plus middle name, and last name. Based on the selection, the data type is split into the selected data types.

Additionally or alternatively, suggested split data types are presented to the user in a graphical user interface. The user may modify or accept the data types for the two or more data types. For example, the graphical user interface may present a drop-down box for each suggested split data type indicating the suggested data type and a list of alternate data types. The user may modify a data type by selecting an alternate data type from the drop-down box.

As an example, Web app management application 116 may determine that a string data type can be split into a number data type and a string data type. A graphical user interface may display a first drop-down box with a number data type selected, and a second drop-down box with a string data type selected. The user may indicate that the string should be split into two strings rather than a number and a string Additionally or alternatively, data types that can be split into two or more data types are presented to the user in a graphical user interface. The user may select which data types should be split into two or more data types. In response to receiving the selection, the selected data types are split into two or more data types. For example, the organized data may include a string data type corresponding to an address, a string data type corresponding to a name, and a string data type corresponding to a set of geographic coordinates. Web app management application 116 may determine that the three string data types can each be split into two or more data types. The graphical user interface may display a selectable list comprising the address, the name, and the geographic coordinates, and/or the three string data types. The user may select each string data type that should be split into two or more data types. For example, the user may indicate that string data types corresponding to the address and the name should be split, but that the string data type corresponding to the set of geographic coordinates should not be split. In response, the selected string data types may be split as described above.

At step 406, the Web app management application 116 determines, for each data type of the one or more data types, one or more suggested widgets. Each suggested widget is a widget type corresponding to the data type. For example, a numeric widget may be suggested for a numeric data type, a date widget may be selected for a date data type, and etc. In an embodiment, a plurality of widgets are potential suggested widgets for a data type. A particular widget of the plurality may be selected based on the portion of the organized data corresponding to the data type. For example, widget types of potential suggested widgets for a string/text data type may include single-line text, multi-line text, rich text, or dropdown box. If data corresponding to the data type includes multiple lines of text or text that is over a certain number of characters, then a multi-line text widget may be suggested. If the data includes a limited number of options (e.g., multiple rows have the same value for a column), a dropdown widget may be suggested.

In an embodiment, if a data type was split into two or more data types, a suggested widget is determined for each data type of the two or more split data types.

Figure 6:
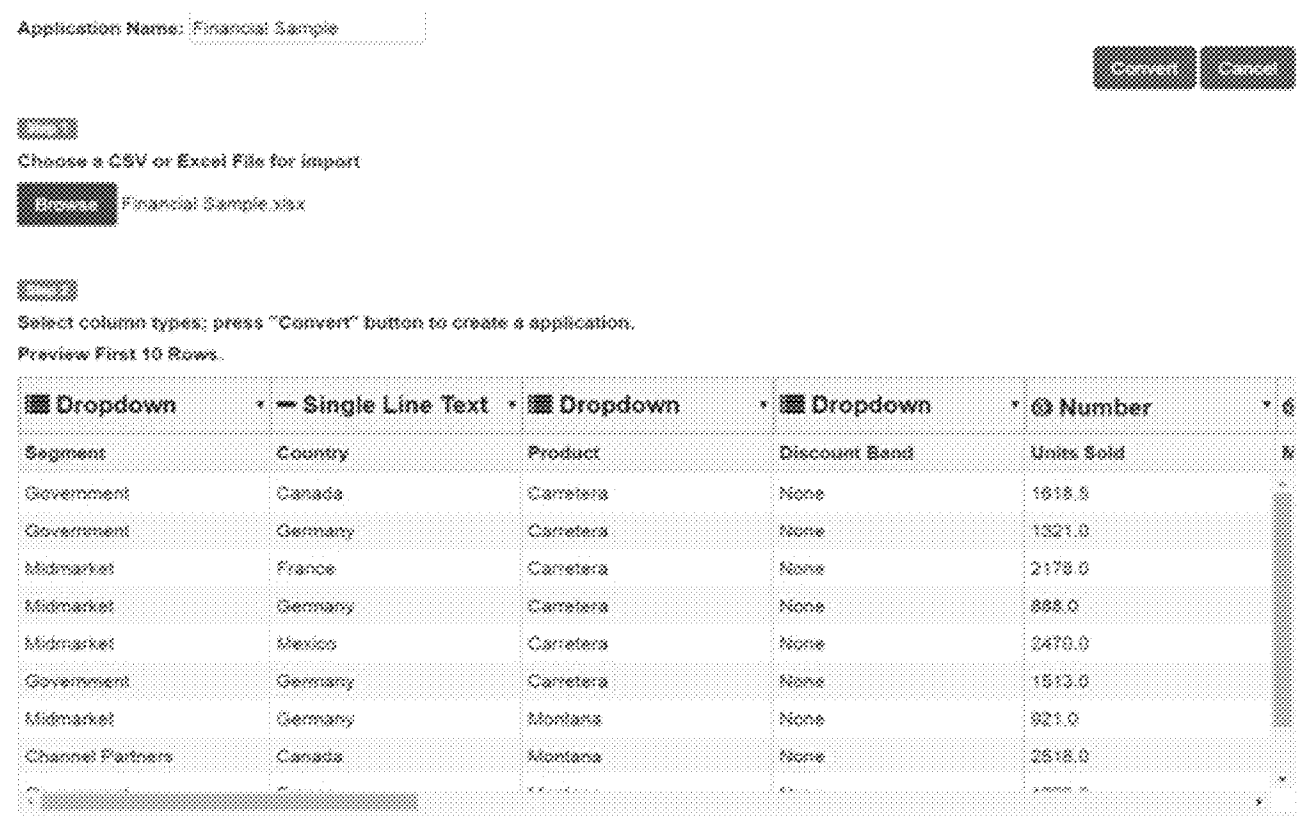

At step 408, the suggested widgets are displayed to the user in a graphical user interface. In an embodiment, the suggested widgets are displayed along with a preview of the data corresponding to the suggested widget. For example, one or more portions of the organized data that correspond to a suggested widget may be displayed with the suggested widget. FIG. 6 depicts an example display that may be presented to a user. In the illustrated example, a plurality of suggested widgets are presented in a header row. The widget type for each suggested widget is displayed. The subsequent rows display rows, where each column of a row includes data corresponding to the suggested widget shown above. Each row may correspond to a data record of the Web app, if generated, and each column of the row may correspond to a data field of the data record.

In an embodiment, the graphical user interface allows the user to re-order the suggested widgets, modify a suggested widget, split a suggested widget into two or more suggested widgets, or merge two or more suggested widgets into a single widget. Modifying a suggested widget may include changing the widget type or removing the suggested widget.

As an example, in response to a user request to merge two or more widgets, a suggested widget for the merged widget may be presented. The widget type of the suggested widget may be based on the widget types of the two or more widgets. For example, if a date widget and a time widget are merged, the suggested widget may be a date-time widget. Additionally or alternately, the widget type of the suggested widget may be a default widget type, such as single-line text. For example, if the two or more widgets correspond to incompatible widget types then the default widget type may be selected. Widget types may be incompatible if they do not correspond to the same data types. For example, two widgets may be incompatible if the first corresponds to a date data type and the second corresponds to a string data type. In addition, the preview of the corresponding data may be modified to indicate the merge.

For example, a single-line text widget may correspond to a city and a drop-down list widget may correspond to a state. The single-line text widget may be displayed with one or more cities contained in the organized data, and the drop-down list widget may be displayed with one or more states contained in the organized data. A user may select the single-line text widget and the drop-down list widget, and select a button or other user interface element indicating that the two widgets should be merged. In response, the single-line text widget and the drop-down list widget may be removed and replaced with a single-line text widget corresponding to a combination of city and state. The each of the one or more cities and the one or more states may be paired, and the one or more pairs are displayed in association with the merged single-line text widget.

In an embodiment, a plurality of possible widget types are determined and the user may select a widget type of the plurality. For example, if a drop-down list widget and a radio button list widget are merged, the merged widget type may be any widget type that allows selecting an option from a list, such as a drop-down list, a radio button list, a combo box, and etc. A suggested may be presented to the user as part of a selectable list, and the user may select an alternate widget type from the list of options.

In an embodiment, widgets of particular widget types are not able to be merged. For example, calculation widgets and lookup widgets may not be merged with other widgets. The user may not be able to select a widget of these particular widget types to merge them with other widgets.

As another example, in response to a user request to split a particular widget into two or more widgets, a set of suggested widgets may be determined based on the particular widget. In addition, the preview of the corresponding data may be modified to indicate the split. For example, a single-line text widget may correspond to customer addresses and be displayed with one or more customer addresses contained in the organized data. In response to a user request to split the single-line text widget, the widget may be split into a number widget corresponding to street numbers and a single-line text widget corresponding to street names. The preview may be updated such that the number widget is displayed with the street numbers of the one or more customer addresses and the single-line text widget is displayed with the street names of the one or more customer addresses.

In an embodiment, in response to receiving a request to split a particular widget, the Web app management application 116 determines that the data type corresponding to the particular widget may be split into two or more data types. Determining that the particular data type may be split into two or more data types may be based on the data corresponding to the data type, as described above. A suggested widget may be determined for each of the two or more data types. In an embodiment, the graphical user interface may display an indication of the potential split. The user may modify each data type and/or the suggested widget for each data type.

Additionally or alternatively, the user may specify the number of widgets into which to split the particular widgets and/or the type of widgets. The Web app management application may automatically split the particular widget into the specified number of widgets. In an embodiment, if the corresponding data type cannot be automatically split into two or more data types as specified, a notification may be sent to the user and the split may not be completed. Alternately, the user may indicate how the data should be split, or the widget may be split but the data may be associated with fewer than all of the split widgets. As an example, one or more portions of the organized data corresponding to the data type may be displayed in a graphical user interface. The user may identify, using the graphical user interface, how the one or more portions of the organized data should be split. For example, the user may draw dividing lines, boxes, or other indicators around parts of the displayed data. The data type is split based on the user input. As another example, a particular widget corresponding to customer names may be split into three widgets corresponding to first name, middle initial, and last name, respectively. One or more customer names may not include a middle initial. When the widget is split, not all customer names may be split such that data is associated with the middle initial widget.

At step 410, in response to receiving user input accepting the suggested widgets, a Web app is generated comprising the set of suggested widgets. If the user modified, moved, split, or merged widgets, the Web app includes the modifications to the set of suggested widgets.

At step 412, the organized data is automatically added to the new Web app. If a data type was split into two or more data types, adding the organized data includes splitting the corresponding portions of the organized data. If two or more data types were merged into a single data type, adding the organized data includes merging the corresponding portions of the organized data.

For example, the organized data may be divided into one or more records. Data for each record may be divided into one or more fields, where each field corresponds to a widget of the Web app. The organized data is stored as a plurality of data records, each data record comprising a respective one or more data fields.

IV. Benefits of Certain Embodiments

One of the problems with conventional spreadsheet files and spreadsheet software is that each user that wishes to view or modify a spreadsheet has to have software compatible with the spreadsheet file. In addition, multiple users cannot concurrently open the file at the same time. In an embodiment, an approach is described for storing and managing data using Web apps. The approach allows storing spreadsheet data in any network storage system, including cloud systems hosted in a distributed network of servers. The Web apps may be accessed by any user using any computing device with a Web browser. In addition, according to some embodiments, multiple users may connect to an application server and access the same Web app at the same time. Web apps may also be assigned user permissions such that some users may view, add, or modify data, while some users may only view the data but may not add data or modify the existing data. As a result, the approach reduces the usage of computing power, memory, and/or bandwidth by consolidating data into single Web app that is accessible via a network and making the data easily available to multiple users. Further, this approach allows secure, customized access to data by multiple users.

In an embodiment, an approach is presented for guided generation of Web apps based on organized data. The approach allows automatic analysis of the organized data to identify data types, and automatic suggestion of widgets corresponding to the data types. This results in a Web app that accurately corresponds to the type of organized data that it is meant to store. In addition, the Web app does not need to be specifically programmed nor does it require a user to manually determine which widgets should be included in the Web app. Users do not need specialized knowledge of computer programming or of the data contained in the organized data in order to generate a Web app. In some embodiments, user acceptance of suggested widgets may not be required; the Web app may be automatically generated from the organized data according to the techniques described above, and the suggested widgets are automatically included in the generated Web app.

Furthermore, the approach allows automatic identification and splitting of data types that may be split into a plurality of data types, and suggesting widgets corresponding to the plurality of split data types. The approach provides a higher level of accuracy in the suggested widgets, by automatically splitting data types that are not split within the organized data. In addition, when data is imported into the new Web app, the data is also able to be automatically split and associated with the corresponding widgets. In contrast, with a 'traditional' spreadsheet or database, dividing a column into multiple columns requires re-inputting the data that belongs to each new column. Newly added table or spreadsheet columns are not automatically populated. Thus, with the approaches described herein, the overall usability and functionality of the computing device and associated applications is also increased.

V. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
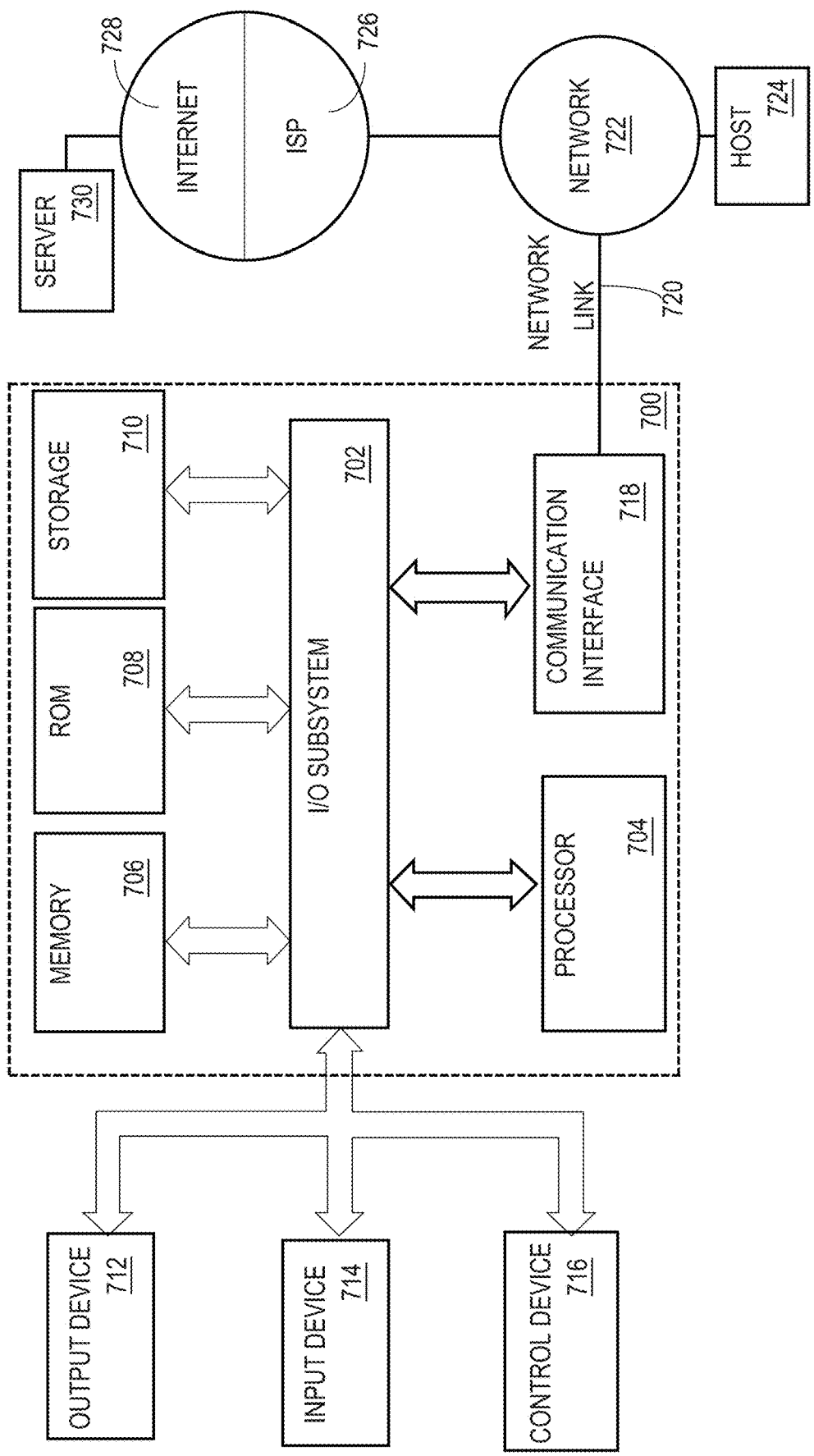
FIG. 7 is a block diagram that depicts an example computer system upon which embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a Web server, Web application server or Web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting Web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a Web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:
1. An apparatus comprising:
one or more processors; and one or more memories storing instructions which, when processed by the one or more processors, cause:
receiving organized data;
identifying a plurality of data fields contained in the organized data;
determining that a data type for a data field from the plurality of data fields can be split into two or more data types and increase a number of data types for the data field;
determining two or more suggested widgets for the two or more data types for the data type for the data field;
displaying the two or more suggested widgets for the two or more data types for the data type for the data field;
in response to receiving user input accepting one or more suggested widgets from the two or more suggested widgets, generating an executable Web application, wherein the executable Web application comprises the one or more suggested widgets.

2. The apparatus of claim 1, wherein each data type of the two or more data types are the same.

3. The apparatus of claim 1, wherein each data type of the two or more data types are different.

4. The apparatus of claim 1, wherein the two or more data types include a data type associated with zip codes and a data type associated with names.

5. The apparatus of claim 1, wherein the two or more data types include a data type associated with a street number and a data type associated with a street name.

6. The apparatus of claim 1, wherein the two or more data types include a data type associated with a last name and a data type associated with a first name.

7. The apparatus of claim 1, wherein the two or more data types include a data type associated with a country code, a data type associated with area code, and a data type associated with a main phone number.

8. The apparatus of claim 1, wherein processing of the instructions by the one or more processors further causes merging two or more particular data types, from the two or more data types, into one data type in response to receiving user input.

9. The apparatus of claim 8, wherein processing of the instructions by the one or more processors further causes modifying a suggested widget from the two or more suggested widgets for the two or more data types for the data type for the data field in response to the merging of the two or more particular data types.

10. The apparatus of claim 1, wherein processing of the instructions by the one or more processors further causes modifying or removing a suggested widget, from the two or more suggested widgets, in response to receiving user input.

11. The apparatus of claim 1, wherein the two or more suggested widgets are a widget type of one or more of a numeric widget type, a single-line text widget type, a multi-line text widget type, a rich text widget type, a check box widget type, a radio button list widget type, a date/calendar widget type, a time widget type, a dropdown list widget type, an email widget type, a calculation widget type, or a lookup widget type.

12. The apparatus of claim 1, wherein the plurality of data fields comprises a plurality of data columns of the organized data.

13. The apparatus of claim 12, wherein processing of the instructions by the one or more processors further causes determining a data type of each data column of the plurality of data columns.

14. The apparatus of claim 1, wherein determining that the data type for the data field can be split into two or more data types according to the data field includes identifying one or more of a numeric value or a character.

15. The apparatus of claim 1, wherein determining that the data type for the data field can be split into two or more data types includes identifying one or more delimiters.

16. The apparatus of claim 15, wherein the one or more delimiters are one or more of one or more carriage returns, line breaks, spaces, commas, or semicolons.

17. The apparatus of claim 1, wherein processing of the instructions by the one or more processors further causes splitting a data type into two or more data types in response to receiving a user request to split a widget associated with the data type.

18. The apparatus of claim 17, wherein processing of the instructions by the one or more processors further causes receiving a request for a number of widgets into which to split the widget.

19. A method for generating a Web application, the method comprising:
receiving organized data;
identifying a plurality of data fields contained in the organized data;
determining that a data type for a data field from the plurality of data fields can be split into two or more data types and increase a number of data types for the data field;
determining two or more suggested widgets for the two or more data types for the data type for the data field;
displaying the two or more suggested widgets for the two or more data types for the data type for the data field; and
in response to receiving user input accepting one or more suggested widgets from the two or more suggested widgets, generating an executable Web application, wherein the executable Web application comprises the one or more suggested widgets.

20. The method of claim 19, further comprising splitting a data type into two or more data types in response to receiving a user request to split a widget associated with the data type.

* * * * *